US005122959A

United States Patent [19]

Nathanson et al.

[11] Patent Number: 5,122,959

[45] Date of Patent: Jun. 16, 1992

[54] TRANSPORTATION DISPATCH AND DELIVERY TRACKING SYSTEM

[75] Inventors: Martin Nathanson; David Brown, both of Montreal, Canada

[73] Assignee: Automated Dispatch Services, Inc., Miami, Fla.

[21] Appl. No.: 264,048

[22] Filed: Oct. 28, 1988

[51] Int. Cl.⁵ .......... G06F 15/48

[52] U.S. Cl. .......... 364/436; 340/993

[58] Field of Search .......... 364/436, 467; 340/993, 340/994, 995

[56] References Cited

U.S. PATENT DOCUMENTS

| | | | |
|---|---|---|---|
| 4,015,804 | 4/1977 | Dobler et al. | 364/436 |
| 4,092,718 | 5/1978 | Wendt | 364/436 |
| 4,212,069 | 7/1980 | Baumann | 364/467 |
| 4,360,875 | 11/1982 | Behnke | 364/436 |
| 4,613,913 | 9/1986 | Phillips | 360/51 |
| 4,646,015 | 2/1987 | Phillips | 324/253 |
| 4,686,642 | 8/1987 | Buxton et al. | 364/607 |
| 4,701,760 | 10/1987 | Raoux | 340/993 |
| 4,713,661 | 12/1987 | Boone et al. | 340/994 |
| 4,734,863 | 3/1988 | Honey et al. | 364/449 |
| 4,791,571 | 12/1988 | Takahashi et al. | 364/436 |
| 4,799,162 | 1/1989 | Shinkawa et al. | 364/436 |

OTHER PUBLICATIONS

Etak. Inc. brochure "Navigator"—1986, 7 pages.

Etak. Inc. brochure "Emergency Response System" undated, 5 pgs.

Megadyne Information Systems brochure "V-Trax Product Description" Sep. 1988, 8 pgs.

Megadyne Information Systems Product Brief—undated, 7 pgs.

Motorola Automatic Vehicle Location System brochure—1986, 6 pgs.

Motorola Automatic Vehicle Location System brochure—1985, 6 pgs.

Morrow, Inc. Vehicle Tracking System brochure—1987, 6 pgs.

Gandolf Systems Group Cabmate brochure—undated, 4 pages; Cabmate brochure, 4 pgs.

Mobile Data Int'l—Databurst Newsletter—Spring 1987, 5 pgs.

Mobile Data Int'l—Databurst Newsletter—Wiinter 1985, 3 pgs.

Mets, Inc. Automatic Vehicle Location brochure—undated, 6 pgs.

*Primary Examiner*—Thomas G. Black

*Attorney, Agent, or Firm*—Dickstein, Shapiro & Morin

[57] ABSTRACT

An integrated vehicle dispatch system that performs the management, coordination and communication functions for dispatching vehicles. The system include a plurality of microcomputers interconnected via a "BIT-BUS" network, such that a fully redundant capability is provided. Each of the workstations control text and or graphics monitors. Information in the graphics monitors are based upon a digitized map base, such as the U.S. Census Bureau GBF file or "DIME File" of the vehicle delivery areas, such that vehicle pickup, deliveries, minimum path routes and vehicles delivery zones are displayed in an icon-based format. The software of the system calculates minimum travel time based upon a tree-node decision algorithm that matches street distances, and travel times to real traffic conditions. Candidate vehicles for pickups and deliveries are selected upon a user-defined set of factors that include time, speed, vehicle characteristics and distance factors. The software also includes a fully integrated third party billing and business operations accounting package that enables fully automated dispatch system operation.

42 Claims, 4 Drawing Sheets

TRANSPORTATION DISPATCH AND DELIVERY TRACKING SYSTEM

TECHNICAL FIELD OF THE INVENTION

The following invention involves a computer integrated dispatch routing and operations management system designed for use in emergency and non-emergency vehicle delivery environments.

BACKGROUND OF THE INVENTION

With the advent of computer technology, vehicle dispatching systems have been developed to more adequately track the location and movement of a variety of delivery vehicles. Despite the added efficiency provided by computer hardware, many problems still remain. One of the most critical of these is providing a delivery system that employs its resources as efficiently as possible.

One of the most difficult efficiency problems is the need to dispatch vehicles from point to point in response to random orders. In typical vehicle delivery environments, calls arrive at vehicle dispatch centers at various times. The pick up and delivery times and locations of these calls cannot necessarily be predicted in advance. In terms of the computer systems designed to handle deliveries, these calls are known as asynchronous events, i.e., occur randomly. Such events call upon the computer system which manages them to operate in "real-time".

The various attempts to computerize dispatch, incorporate the same artifices used in manual operations and prejudice the optimality of vehicle assignments to random events. These prejudices take the form of constraining the operation of vehicles in time or space. As an example of these constraints, a courier or cartage vehicle may be restricted to delivering in the morning and picking up materials in the afternoon. Space constraints can be also characterized by the use of zones circumscribing the allowed operational territory for each vehicle.

The reason that these constraints prejudice optimization is that they eliminate the dispatcher's opportunities to capitalize on these various random events. For example, a vehicle may be picking up something in one zone and then delivering the item to a second zone outside its own territory. Thus, it may be preferable to assign that vehicle to a new pick up in the second zone, rather than having the vehicle returned to the original zone. Such time and space constraints can cause inefficient use of the transport resources and possibly overload or underutilize equipment.

A further efficiency problem with current computerized dispatch systems is the efficient allocation of resources in order to maximize vehicle response time. A dispatch operation is predicated on the ability to consistently judge the time and location factors associated with each event. It is simple for current systems to match a single address to a single location in space. However, it becomes harder for such systems when one or several vehicles are moving at the same time and three or four locations are being delivered to simultaneously.

To overcome the response problem, the computer system must provide a means of reproducing all of the "cognitive" processes in a manual system that are required to effectively meet the various utilization conditions. In other words, the system must factor in several considerations to the decision: the time and space implication of each event, the dispatching decision to assign the resources, and the capability of reporting the status simultaneously to all resources.

A further efficiency problem relates to the lack of computer systems which can integrate the management and the allocation of resources and effectively communicate decisions system-wide. There is also a need for a system which not only handles the basic management tasks, but successfully integrates a plurality of ancillary functions. Such functions include: address location work, point-to-point travel time estimation based upon road network and expected traffic conditions, and the communication of vital information to customers. The prior art does not have any integrated systems that overcome these problems and that also integrate these ancillary functions.

As discussed, there are several delivery systems which coordinate vehicle dispatching. One such system is the CABMATE manufactured by the Gandalf Systems Group, 350 East Dundee Road, Wheeling, Ill. CABMATE consists of a Dispatch Terminal set up in a driver dash-mounted computer terminal linked by radio transceiver to a host dispatcher's computer. The options available in the CABMATE System include customized city street directory, interface capability with accounting software, an integrated parcel dispatching system and an option which allows drivers to queue into the open available cab list before a fare is completed.

The Gandalf System, however, does not provide for any resource which optimizes the utilization of vehicles. Thus, dispatchers are not provided with optimal paths or any graphic displays of the City Maps. Cabs are selected using a first in first out system from the local queue based upon the last fare delivered. Thus, selection of cabs for fares is independent of their location.

Another mobile terminal is available from Motorola, which provides a KDT portable terminal 800 Series for message processing. The Motorola system is used primarily in inventory and business applications. Some of the features of the Motorola software include a service history review program, order status screen, billing information displays, inventory control and dynamic real-time scheduling. However, vehicle management functions which allow for priority based dispatching and allocation are not aspects of the Motorola program.

SUMMARY OF THE INVENTION

It is, therefore, an object of the invention to provide an integrated vehicle dispatch system that performs the management, coordination and communications functions for dispatching vehicles. The system consists of specialized software combined with a micro-computer network and graphics terminals where vehicle operators, dispatchers and customers are able to efficiently schedule deliveries.

Another object of the present invention is to provide for a vehicle dispatch system that assigns the most appropriate vehicle to a given event.

It is an additional object of the present invention to provide a vehicle dispatch system that determines the vehicle assignments based upon a set of individually weighted factors. The factors include the response time of the vehicle to the pick-up, the delivery time of the vehicle and the ability of the vehicle to handle the load weight of the proposed delivery.

It is yet a further object of the present invention to provide a searching capability for searching transactions, addresses and accounts where information from the searches is automatically provided to the order entry program. It is still an additional object of this invention for the address searching capability to receive 911 emergency information and then to automatically fill in the missing address data and geo-coordinates from the 911 information input.

It is yet another object of this invention to provide a rolodex routine, such that a user can automatically receive information most closely related to that search by the address, account or transaction searching capabilities.

It is still a further object of this invention to provide a posting function which enables a user to flush out and post all of the transactions for today, tomorrow, and for reservations of dates previously established.

It is still an additional object of the present invention to provide a system status management module which enables the operator to optimize his resource deployment to fit historical demand patterns and to identify resource posts defined by civic address. Each of the posts are then manned by a number of candidate vehicles based upon the specific days and hours. The vehicles chosen for each post depend upon selected equipment characteristics and on-board personnel qualifications.

It is yet another object of the present invention to coordinate address searching with a geographic regions or geo-based file, such that addresses associated with an event are automatically searched, geo-located and displayed in conjunction with events on a cartographic video representation of the geo-based file (electronic map).

It is still an additional object of this invention to search transactions sequentially, such that, if a transaction is not found under a current date, a pop-up calendar is activated in order to enable a user to choose previous dates for transaction tracing.

It is still a further object of the present invention to provide a pricing program, such that all the prices can be automatically generated for each ordered transaction.

It is yet an additional object of the present invention to provide for a management monitor display which provides the user of the program with a snapshot of key operational statistics for a given period of time.

It is still a further object of this invention to provide for a graphic map display which includes a scope mode allowing a user to zoom, changing map scale in an unconstrained fashion over a particular area.

The hardware system of the present system consists of order entry workstations connected via a network marketed as the "BITBUS" network manufactured by the Intel Corporation of California (hereinafter "BITBUS") to one or more dispatcher workstations. The network is fully redundant such that each input in one micro-computer is stored in the memories of all microcomputers in the system. Each of the dispatcher workstations include microcomputers which control text and color graphics monitors. A mobile digital data device is connected both to the dispatch workstations and to a radio transceiver. The mobile device supplies information to a transceiver on board the vehicles. That information is then processed by vehicle-based microcomputers.

The on-board vehicle hardware may include an automated vehicle locator system based on the LORAN "C" coordinate navigation system. The LORAN transceiver signals the approximate real time vehicle position to the dispatch work station via a digital radio, automatically updating the actual position of the vehicles on the graphic display monitor. The vehicle information is displayed in the form of coordinate maps of the service areas. The maps display icon-based indicators of vehicle locations and downstream itineraries, pick-up and delivery locations, service zones and highlighted displays of vehicle routes.

The software of the delivery system is organized into three main programs supported by numerous subroutines and functions. The order entry program enables files to be automatically set up based upon different input types. Hence, through the use of past transaction, address or account seeking techniques, incoming requests can be filled in automatically rather than requiring the caller to "spell out" every detail.

The second main program is known as the dispatcher. This program allows for the selection of candidate vehicles based upon pre-selected criteria. In addition, this program assigns routes to selected vehicles, calculates the minimum path travel times for those routes and monitors the successful completion of pick-ups and deliveries.

The third program is known as the mobile digital data system (MDDS) program. This program controls the flow of communication between the dispatcher and the drivers in a mobile environment. This program performs the function of receiving and storing all data transmissions originating from multiple dispatcher workstations and communicating the transmissions with multiple vehicles. The maps facilitate dispatch communications by calculating downstream itineraries based upon insertions/deletions made by the dispatcher.

DETAILED DESCRIPTION OF THE INVENTION

I. The Hardware

Figures 1A, 1B:
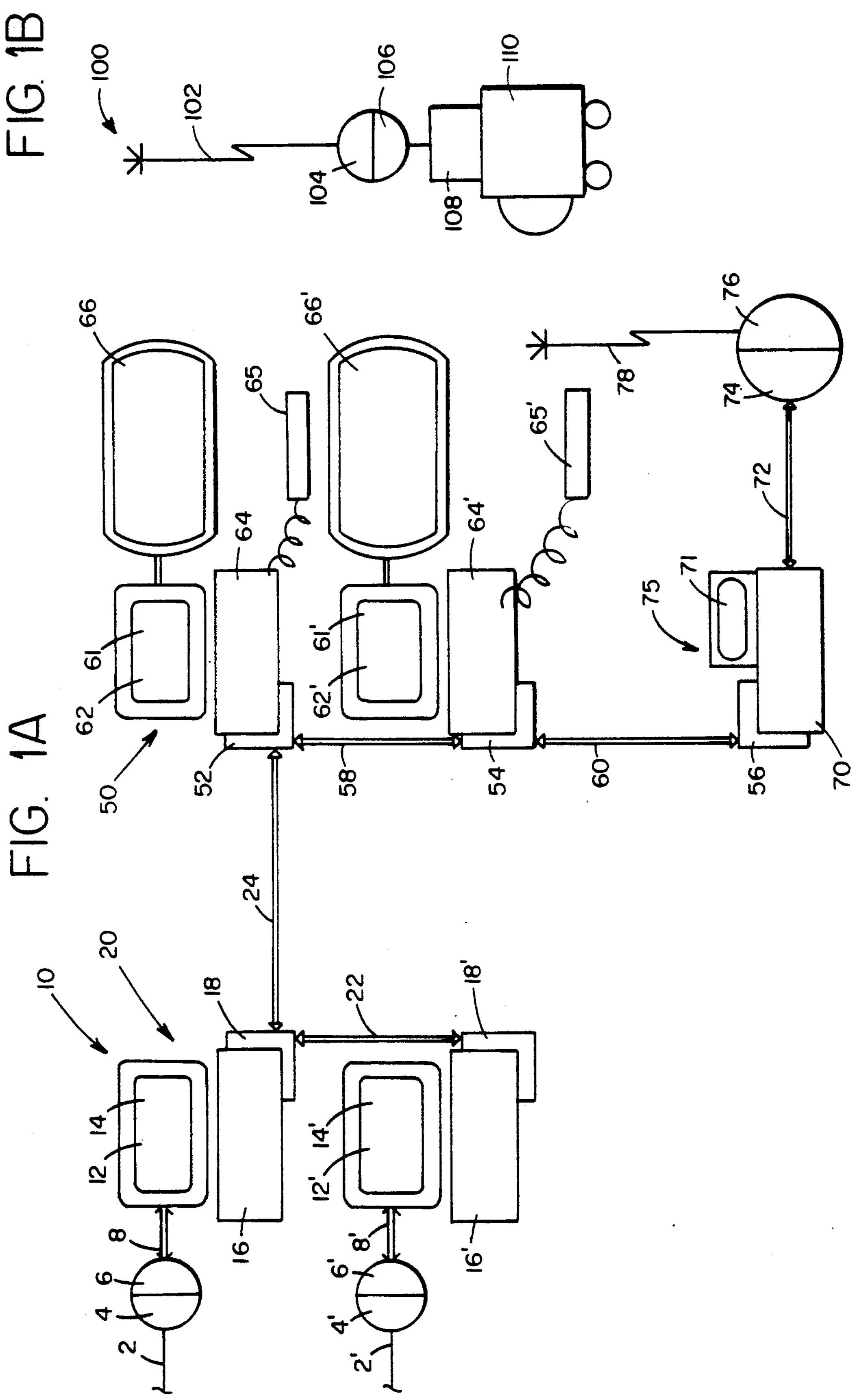
FIG. 1A is a schematic block diagram of the hardware of the order entry and dispatch workstations which form the present invention.
FIG. 1B is a schematic block diagram showing the mobile unit of the present invention.

Referring to the figures wherein like reference numerals refer to like parts, FIGS. IA and IB illustrate the hardware system of the present invention. The system uses micro-computer-based devices which together form an inherently redundant network. The microcomputers are fully MS-DOS compatible, have open architecture programming and are interfaceable with popular dBASE software products. Other data base and other software products in the MS-DOS operating environment can also be used. The system hardware design supports all automatic vehicle locator (AVL) products as well as all mobile digital terminals and bio-telemetry devices. All hardware in the system is used daily and can handle any task from incident taking to dispatching.

By networking microcomputers together using "BITBUS" technology, a multiple redundant network is achieved. Each machine in this network carries in its memory every transaction made by any single unit in the system (when a transaction, accident report or field thereof is entered on any of the machines, all of the machines in the system receive and store the information). Thus, if one computer fails, the system continues with no performance or data loss. As a result, expensive backup computers are not necessary.

Turning now to FIG. 1A, the workstation configuration 10 is illustrated. More particularly, two workstations are shown: An order entry workstation 20 and a dispatch workstation 50. Each of the workstations are connected by a "BITBUS" 24.

A. The Order Entry Workstation

The order entry work-station 20 shown in FIG. 1*a* consists of two order entry computers 12, 12' which are adapted to receive incident information. This information is supplied to the computers via an RS-232C communications port 8, 8' through Hayes compatible modems 6, 6' connected to telephones 4, 4'. Each of the telephones is in turn connected to outgoing and incoming transaction lines 2, 2'.

Each of the computers 12, 12', includes a color monitor 14, 14' controlled by a color graphics adapter card placed in the computer cabinet 16, 16'. The types of computers used in the workstation 20 may preferably be a PC-XT, AT or any other IBM compatible PC. The computer memory includes 640 kilobytes of RAM and a 20 megabyte hard disk with a 28 ms. average access time. In addition, the computer includes a multi-function I/O controller card for controlling the RS-232C port as well as an internal real-time clock.

The hard disk contains sufficient storage space for approximately 60,000 transactions. Of course, a larger size storage medium, sized to meet the user's transaction level, could also be used. This figure may vary according to the size of the database installed (geographic, graphic file, customer account information, etc.). The system has a built in feature such that whenever it detects at wake-up that a workstation has less than three megabytes of remaining free storage space, it will automatically cancel the session until the operator has cleared a sufficient amount of space (using, for example, DOS copy and DEL commands to clear previous weeks files and archive them on tape). Thus, with the added redundancy of storing all features of all transactions in all of the workstations memories, the system retains records that are fail-safe from power loss or equipment failure.

The computers 12 and 12' are connected to one another via a "BITBUS" 22. The "BITBUS" is controlled by Intel 8051-based controllers 18, 18'. They are also connected to the dispatch stations 52, 54 and the MDDS 56. A "BITBUS" 24, in turn, connects the order entry stations 12 and 12' to the dispatch workstation 50. The "BITBUS" cabling is shown as elements 22, 56 and 60 in FIG. 1A.

B. The Dispatch Workstation

The dispatch workstation 50 consists of at least one microcomputer. In the present embodiment, two microcomputers 61, 61' are shown. Each of those microcomputers includes a color text monitor screen 62, 62' and color graphics monitor screen 66, 66'. The color monitors are respectively 12 inches and 19 inches in diameter. The 19 inch monitors 66, 66' are controlled by a professional graphics controller card, such as the PG 1280 or 1281 cards manufactured by the Matrox Corp. of Montreal, Canada. As such, the monitors provide a high-speed parallel graphics capability to the workstation. Both the text and graphics screens are controlled by computers 61, 61'. The types of computers that may preferably be used are those compatible with the an Intel 80386 based compatible microcomputer having an Intel 80387 math co-processor. The memory for the microcomputers includes 640 kilobytes of RAM and 40 megabytes of hard disk. Moreover, each computer includes a 2 megabyte RAM extended memory card, a multi-function I/O controller card, and graphics adaptor cards, as described above.

In use, a dispatcher uses a pre-programmed function keyboard 65, 65' in order to route units, view transactions on the text screens 62, 62', display information on individual units, assign units, accept confirmations from drivers, change assignments, confirm units, zoom-in on specific geographic locations on the graphic screens 66, 66', and position trip locations.

Each of the dispatch microcomputers 61, 61' are connected via "BITBUS" 58 through a "BITBUS" d-DCM 800 "BITBUS/PC" trademark of DATEM, Ltd. of Ottawa, Canada interface controller 52, 54 and an MS/DOS interface located inside the microcomputers. Information communicated on the "BITBUS" includes redundant transaction data and polled AVL information. The AVL data consists of coordinates representing each vehicle's real time location as the vehicle travels through a street network. A software module in microcomputer 61, 61' provides an interface for the AVL signal. The module provides coordinates based on the coordinates provided by the AVL. The vehicle coordinate information is then error-corrected in software to update the vehicle's position on the graphic display. Each of the dispatch workstations also provides output information via the "BITBUS" 60 to a mobile digital dispatch system (MDDS) unit 75.

C. The MDDS Hardware

The MDDS unit uses a "BITBUS" controller 56. The controller 56 is connected to a microcomputer 70 which can either be a PC-XT, AT or compatible device or an 80-386-based compatible microcomputer device. The MDDS microcomputer 70 includes an RS-232 port and interface card, a real time clock, a multi-function I/O controller card, and a hard disk. The hard disk stores 20 megabytes of data and the RAM stores 640 kilobytes. Finally, the microcomputer includes a 12 inch monochrome monitor 71 for displaying the status of the digital radio communications.

The microcomputer 70 is connected via an RS-232 serial-channel 72 to a modem 74. The modem is compatible with a radio transceiver 76. The radio transceiver 76 device operates at a minimum of 2400 baud.

In operation, the modem 74 modulates and demodulates all data passing between the computer 70 and the mobile units 110 (see FIG. 1B). This link uses a carrier detect protocol format allowing both voice and data transmissions to occur simultaneously, on the same frequency, using the same hardware. The transceiver 76 can be hard-wired to the modem 74, and the microcomputer 70 or it can be a separate data-radio transceiver which is supplied as one integral unit. Examples of such tranceivers include the device marketed under the name "DATARADIO" by Dataradio Corp. of Montreal, Canada (hereinafter "DATARADIO").

In situations requiring especially high performance or where radio communications on existing frequencies are problematic, a transceiver 76 can be specially built for data transmission at 4800 baud or above. These special transceivers can also use fast turn on delays and allow for less data packet collisions. The result of such an arrangement is clear digital radio-communications under the most adverse conditions.

The dispatcher system fully supports the use of microcomputers in the ambulance. Digital communications can be installed inexpensively using existing voice-radio as a transmission medium. The addition the "DATARADIO" modem and microcomputer both at the dispatch center and in the vehicle can provide all the benefits of digital radio communication. By using such a "DATARADIO", all information stored in the system (page and files, vehicle routing, billing information, etc.) can thus be sent to a vehicle.

The dispatch of signals is controlled by the network controller 70 which listens in and sends messages between vehicles and the dispatch workstation in much the same manner as a telephone switchboard. As a result, biotelemetry information (including a 12 lead ECG signal) can be sent in a matter of seconds from the patient's side in the ambulance or vehicle to a hospital.

D. The Mobile Unit

FIG. 1B illustrates the mobile unit 100 mounted on a display vehicle 110 that is adapted to communicate with the radio 76 of the dispatcher 50. The mobile digital communications unit 100 consists of an antenna 102 connected to a radio transceiver 104. The radio is hard-wired to a modem unit 106 which is connected by an RS-232C channel to a CPM or DOS-based portable microcomputer 108.

The microcomputer 108 includes a serial communications port and an LCD monitor screen (not shown). The microcomputer 108 can include a Z-80 or HD 64180 type microcomputer operating under a CP/M, MS-DOS or Z-DOS operating system (with extended functions for serial I/O, time and power). The microcomputer also includes a nonvolatile RAM disk.

The terminal 108 employs a display of sufficient size to allow the driver to review a large amount of detailed information in a single call. It is preferred that the minimum screen size for the microcomputer 108 will be an $8\times40$ or $16\times16$ display. The type of LCD will preferably be a back-lit twisted LCD screen.

The microcomputer 108 also includes an internal battery power unit having fail-safe automatic shutdown and RAM-save facilities. The software includes power control functions for the system and the computer may preferably be case-hardened such that it can withstand temperature extremes, spills, and shock vibrations from accidental drops or driver abuse.

An example of the type of computer meeting all of the above requirements is the computer marketed as the "MICROSCRIBE" from the United Kingdom. The salient features of the "MICROSCRIBE" are an HD 64 manufactured by Motorola or a Z-80 processor manufactured by Zilog, a CP/M or a DOS operating system, a nonvolatile RAM disk, an $8\times40$ back-lit twisted LCD display and water resistant casing.

II. The Database

Although the database for the dispatch vehicle system is not shown in the figures, a description of its composition and method of creation are important to an understanding of the invention. In the Dispatch system, the database is defined as a logical sequence of stored information consisting of streets, place names, and any other features that are relevant to a city network. In the order entry program 200, the stored information is called a geographical database. In the dispatch program 300, the stored information is called the topological database. Each of these databases are set forth in more detail below.

The geographical database allows street, place names and other features to be associated with geographical coordinates. The geographical database contains metropolitan network data such as street names and corresponding civic numbers as well as regional network data such as town names and cities. Depending on the application of the system, the metropolitan and regional databases are different and kept separate in an application but their structures are equivalent.

The geographical database in composed of three files: the Streets file, the Civics file and the Munic file. Using the three files mentioned above, the street file links the other two files together.

The STREET file contains information such as street names, type, direction, and any features corresponding to the street name, including the municipality in which the street is located. The Civic file contains all the civic numbers (street address numbers) and corresponding geographical coordinates for each intersection in the network. The Munic file is a lookup table which contains unique codes for each municipality name in the metropolitan area.

The combination of the three files is used extensively by the order entry program 200, allowing for rapid origin and destination location determination in the metropolitan network. The structure of the geographical database is designed to simplify and eliminate all possible overhead in searching and locating specific points within the boundaries of the metropolitan area.

Wherever possible, numerical data (municipality codes, civic numbers, coordinates) are compressed to binary format to maximize the speed and scope of access to metropolitan geographical data on any single PC-type work station. This is shown in the use of the Rolodex program 218 in the order entry module in which, if a street is misspelled, the user can verify and select the street name belonging to the municipality where his client is located (to be further discussed). The program can be described as a street guide that can be read without having to look at a map to find the exact location of the client's address.

The geographical database is created in a three step process. The first step involves digitizing the data. That step involves passing high quality maps through an interactive digitizing system. As a result, the step identifies the coordinates of each intersection automatically and enables input of the relevant information for each street segment (link). The resultant file will be referenced as FILE I.

In the second step, the files are converted into a format where all information pertaining to each street segment is isolated within each file record. That has been done to isolate all data pertaining to each street segment so that future editing such as addition, deletion or modification of street segments can be accomplished using the same digitizing system. The resultant file will be referenced as FILE II. A file of this type is available for most metropolitan areas in Canada and the U.S. from, for example, The Census Bureau, and is referred to as a GBF File or "DIME File".

The third step converts FILE II into two files: The STREETS.XXX and CIVICS.XXX files. Those files will be referenced as FILE III. The streets file is an ASCII-sorted sequence of uniquely named street segments within a specific municipal corporation containing pointers to the coordinates and civic numbers in the Civic file. The Streets file also contains a final byte called a continue code indicating whether the previous record contains the same ASCII string (street name and type), which allows for faster search and more assistance to the operator in identifying possible ambiguities where streets extend through several municipalities or where multiple occurrences of the same street name in different sectors of a metropolitan area exist.

The geographical database also has another usage. Since it contains all street segments within a metropolitan area, it is used as the basis for the map image in the dispatch program 300.

The front images on the graphics screens 66, 66' are created from FILE II. Since the FILE II contains in each record all the information relevant to each street segment for the metropolitan area, the actual drawing of each street segment is simply moved to a first point of the segment and drawn to a second point of the segment. This is done for each street segment from the file.

As the segments are drawn, they are recorded as vectors in a vector file. The integrated vector or graphic "Meta" file for the entire metropolitan area allows for the graphic input cursor "scope" to create and "zoom" in on any window desired by the dispatch program user. Once the whole metropolitan area has been drawn, the whole image is stored in another file, in binary-pixel format. As a result, a display for the metropolitan image is quickly created pursuant to a "refresh" command after a "zoom" operation.

The topological database is developed from FILE II. It may or may not use all of the information from FILE II. The topological database primarily consists of street segments or links, and their respective node numbers with X, Y coordinates. Its main purpose is to route vehicles through the road network at dispatch time. The topological database is built to ensure complete "connectivity" throughout the road network so that the vehicle routing algorithms can always find a path from any point to any other point in the metropolitan area.

Part of the preparation process includes an automated procedure for "stripping" the network (metropolitan or regional) of unnecessary roads. These stripped possible roads include dead ends, a sequence of links joined by only one node, and other extraneous street segments whose presence would only increase the time required to find the minimum path, without necessarily improving the accuracy of the routing and tracking system.

Once created, the topological database consists of four file formats: the Link file, the Link Category file, the Link Distance file and the Node file.

The Link file consists of two node numbers, which designate the link number.

The Link Category file defines the road classification of the links from the Link file. Expected travelling times along each link are computed from knowledge of the road classification and the link distance.

The Link Distance file defines the distance for each link from the link file in units of miles or kilometers.

The Node file contains all intersections (nodes) which connect all links. This file also contains all coordinates that position the street intersections on the map.

III. The Software

A. The Other Entry Program

Figure 2:
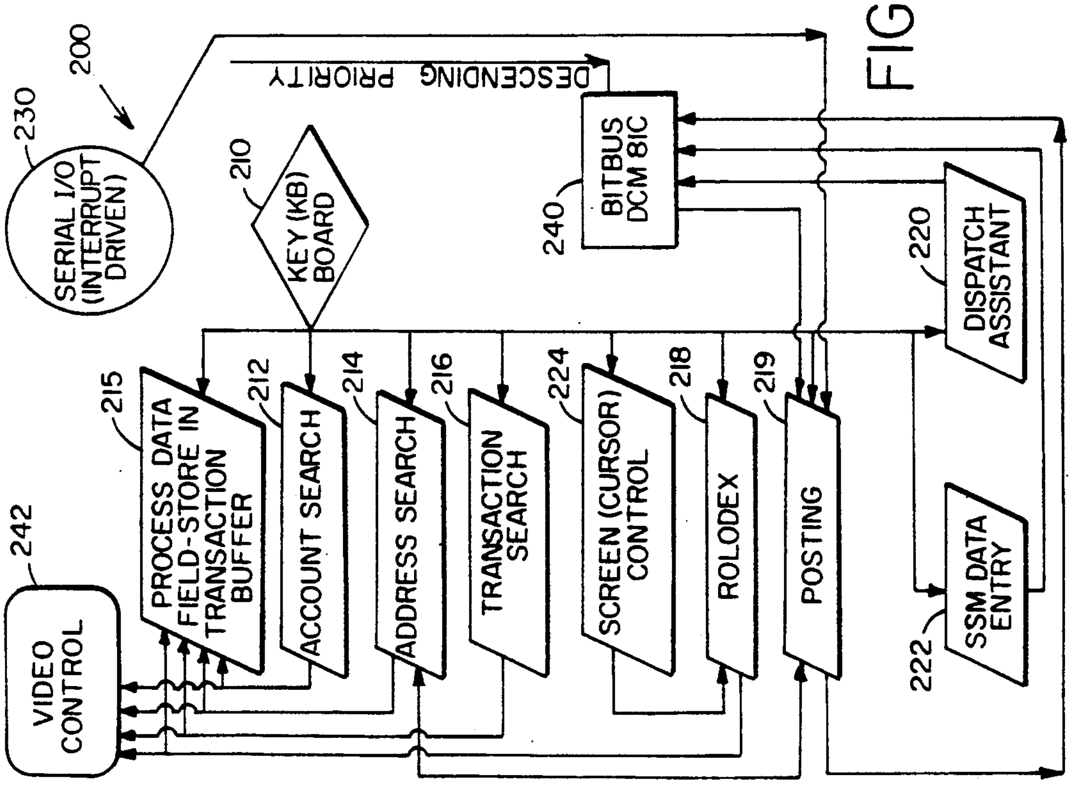
FIG. 2 is a flow chart representing the order entry program employed in the hardware of FIG. 1A.

As shown in FIG. 2, the order entry system 200 primarily functions to automatically verify and locate each incident address, account or transaction that is received as input. All available information regarding a prior patient is automatically recalled and relayed to the dispatch program (see FIG. 3). Upon system installation, a complete rolodex file 218 of every address in every municipality within a given service area is entered. In addition, a complete listing of all street location "pointers" to a graphic map display, accurate to the block level, is provided by the rolodex 218.

Other on-line rolodex files instantly available to the order entry program include the patient rolodex, the subscription rolodex, the place-name rolodex, the address rolodex and the account tracing files. The order entry screen may be customized to each client's specifications to ensure an operational integrity and capture of all relevant data.

The order entry program 200 consists of three levels of external event processing: the keyboard level 210, the serial input/output level 23 (SIO) and the "BITBUS" processing level 240. The subroutines of this program are described in more detail below in the context of each level of event processing.

1. The Keyboard Level

The keyboard level 210 is programmed to activate a variety of functions including the output of messages to the "BITBUS" 240 and to the SIO 230. The keyboard functions to both input and search fields. Data fields are accepted in alphanumeric format and are verified automatically on the system for integrity. Information is stored in a transaction buffer 215 which is then flushed when a transaction is posted to the dispatch system or refiled when the transaction is recalled.

The keyboard level 210 utilizes three search routines: the account search 212, the address search 214 and the transaction search 216. Each of the searches is activated by the entry of datafields which provides "keys" initiating such searches. For example, in a metropolitan environment, the address search requires a minimum of one street name and either a cross street or a civic number. The address search 214 will, if successful, output the name of the municipality to the appropriate data field, to both the screen and internally to the transaction buffer 215.

Each of those searches then acts to "fill in" the information based upon what is input into the keyboard 210. A successful search will fill in the appropriate data fields in the screen based upon an initial input. Any subsequent entries on the keyboard 210 and will be automatically detected by the system as possible updates to the file and a system query for the desired update will be automatically handled. A more detailed description of the account address and transaction search programs 212, 214 and 216 is provided below.

As previously discussed, the rolodex subroutine 218 provides scrolled access on a separate video page to ordered files. The files can include account files, metropolitan street indexes, etc. The rolodex is opened at the closest location matching key which has been entered onto the keyboard 210. By selecting the rolodex entry, the appropriate data field on the screen is filled in and the internal files are automatically updated.

The screen control subroutine 224 provides a plurality of functions which are convenient for cursor positioning and help screens. The screen control functions also will be described later in more detail.

The posting function 219 provides for flushing out of the transaction buffers 215 containing either current transactions or previously recalled transactions. Options available in the posting subroutine include:

1. Post transactions for today;
2. Post transactions for tomorrow;
3. Post transactions for a specific reservation date as previously established using the pop-up calendar in the transaction search; and
4. Any of the above in multiple form, e.g., same pick-up for several inter-city transactions.

The order entry program also includes a system status management (SSM) routine 222. The SSM routine allows for the identification of resource posts which are defined by civic address. The SSM routine allows for the creation of flexible resource deployment plans for specified days of the week at specified hours. There are no system limits on the number of plans that can be developed and stored. The types of plans that can be used include specific disaster evacuation plans, special event plans or routine pre-scheduled work plans. The SSM plans that are entered into this system may include the following components:

1. The number of posts and their geographic locations;
2. The numbers of vehicles required for each post; and
3. The types of vehicles required. The system imposes a two tier definitional requirement for the kind of vehicles required. This requirement will first identify the vehicle equipment characteristics and then identify the on-board personnel, including their certification levels.

In operation, the plans are automatically loaded by the dispatch program (FIG. 3) with a predetermined lead time for the event. A message is then provided to the operator that the plan is imminent. The operator then has the ability to interactively assign resources to posts in accordance with the plan. This capability extends not only to the identification of resources in the service areas, but to those resources outside of the service areas.

The dispatch assistant option 220 allows the order entry program 200 to look like a "dispatch" text screen with all of the text screen control features. These features will be described in more detail below with respect to FIG. 3.

Finally, the order entry program includes a video control program 242 which works in conjunction with a cursor screen control program 224. Both programs 224 and 242 control the presentation of information, the movement of data on the screen and the interaction between the keyboard and the screen. The operation of those programs also will be described in more detail below.

2. The Serial I/O Level

The serial input/output (SIO) event processor program 230 is driven by interrupts from a serial communications controller (see FIG. 1A). The SIO is subject over telephone lines to standard error checking protocols between the sending and the transmitting stations. The SIO program 230 can receive incoming transactions posted on a remote order entry workstation communicating through a Hayes-compatible modem 6 (see FIG. 1A). The SIO interrupt input is also adaptable for direct input of serial ASCII data using DTR/CTS handshaking. Accordingly, the processor can readily interface with an ANI/ALI controller for 911 serial communications. When 911 data is received by the SIO, it is automatically sent to the address search routine 214 where it is appended with exact address coordinates in the transaction buffer 215.

3. The "BITBUS" Level

The "BITBUS" communications program 240 polls the d-DCM 800, 810 PC "BITBUS" interface units 18, 18' (see FIG. 1A). The "BITBUS" software is interrupt driven and has its own firmware-based operating system. Although any operating system can be used, the preferable operating system is based on the Intel RMX-51. The operating system provides for error checking and retry procedures along the "BITBUS". Moreover, the "BITBUS" program 240 includes on-board buffers which allow it to use 13 byte packet storage until the polling routine sends an acknowledgment of its receipt. These capabilities allow the microcomputers to serve both the keyboards and the serial board without the hazard of data loss on the "BITBUS" network.

4. Operation of the Order Entry Program

The various subroutines of the order entry program operate in the following manner. When the keyboard operator types in a delivery request on keyboard 210, the address subroutine 214 can then be activated by a function key once a minimum number of data fields are received (the civic number and street name). The search related fields that require completion by the address search 214 include: civic number, street name, street type, street direction, municipality name and cross street. Depending upon the street naming conventions, the type and direction fields may not be required.

For emergency applications, however, where the civic address cannot be reported, entry of the cross street will cause the address search to find the confluence of the two streets and to report the results.

The address search routine performs an ASCII binary search on the street name file called "Streets.XXX" (the triple X is the file name extension of the metropolitan area, e.g., "MIA" for "Miami"). If the name is found, then the file seek position is backed-up to the first occurrence of that name. Each street file entry includes a pointer to a larger file containing the civic address and the corresponding geo-coordinates. A second file is then searched for a civic address match ("CIVICS.XXX"). If a match is not found, the pointer from the next street file record is used and the process is then repeated. This continues until either the name changes in the street file or a civic address match is found.

If a street match is found, then the search procedure provides the name of the "found" municipality on the display. If the street name is not found, the search procedure outputs a message to the screen that is the closest name found during the binary search. This "close" name will often alert an operator of possible spelling errors. Therefore, the closest street name algorithm will usually find the correct name.

If there *is* a mistake, the operator can then invoke the rolodex subroutine 218 which will display the street index entries with the full name, street type, street direction and municipality. The rolodex program list will start with the closest name to that entered during the address search routine 214. Using this capability, the exact entry can then be chosen by the user. The selection will cause the name, type, direction and municipality fields to be automatically filled. At this point, the program will return the user back to the address search program 214.

As previously mentioned, the address search program 214 can be invoked directly by the SIO program 230. That scenario would apply in the case of ANI/ALI (automatic number identification/automatic location identification) 911-controller input which usually provides an ASCII message containing the billing address corresponding to a given telephone number. When an end of message signal has been received by the SIO, the 911 address information is passed on to the address search procedure 214 before the 911 originating transaction is posted. In such a situation, a flag is set to bypass the interactive queries of the address search procedure 214. If the 911 search does not successfully find the geo-coordinates for the 911 address, the record is flagged and a message is left flashing at the bottom of the operator's screen containing the transaction number. The operator can then recall the transaction in the manner described above to correct address errors originating from the 911 transmission (or from the telephone company's database).

To ensure maximum performance from the address search program, the digital geo-based files are preprocessed for each metropolitan region and updated in the current year. The ordering of these files consists of sorting the records in descending priority by name, street type, street direction, municipality and civic number. The civic addresses and geo-coordinates relating to a specific street are then collected and extracted in a sorted file. A STREETS file with entries for specific names, types, directions and municipalities is then created with pointers to the CIVICS file.

The account search program 212 operates to fill in the appropriate data fields in the account category when a new account or an old account is entered. In the case of an old account, the user enters a corporate or patient name. Once entered, the system will then search for a match of the name and provide that information on the screen. Should the information be correct, then any subsequent keyboard entries to the account will be detected by the system and a possible update of that account file will occur following a system query.

Figure 3:
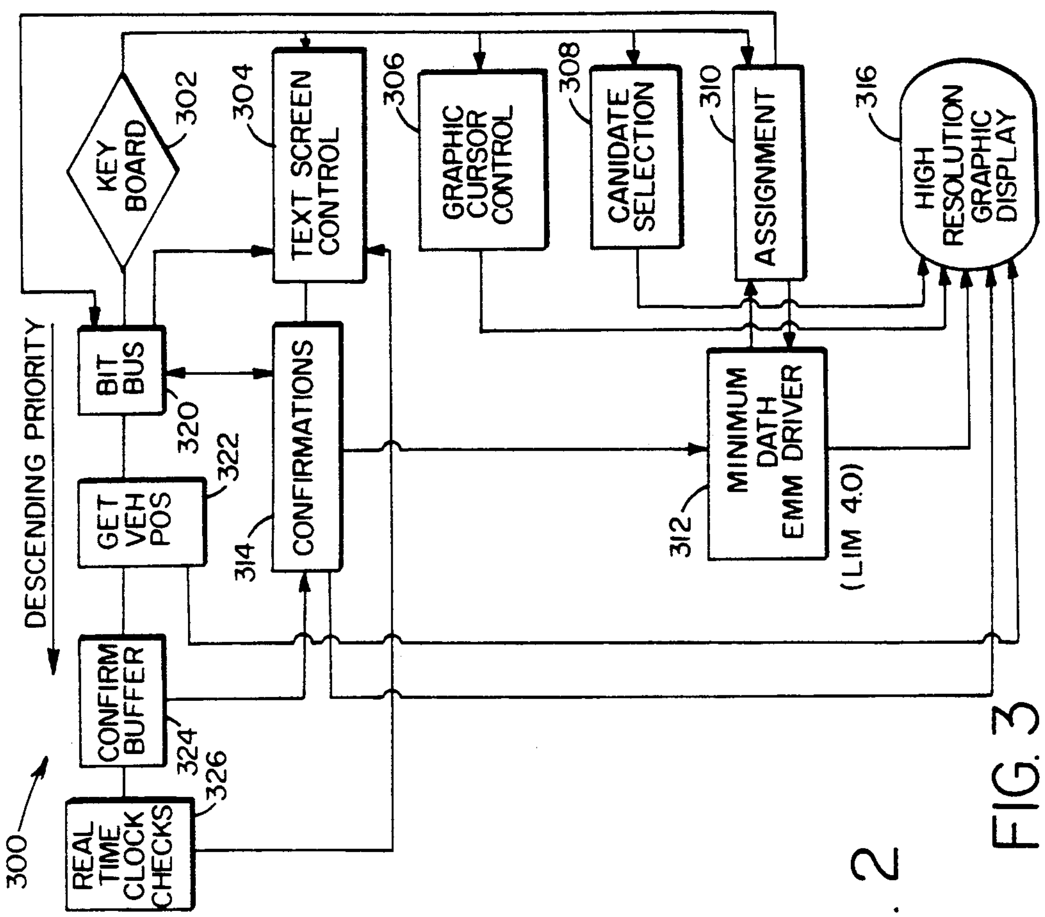
FIG. 3 is a flow chart of the dispatch program employed in the hardware of FIG. IA.

The transaction search program 216 operates when information in any of the fields is entered. The system searches for the first occurrence of a transaction containing this field and that information can then be prompted to continue sequentially until the desired transaction is found. If a vehicle has already been assigned to the transaction, then the order entry screen will display four additional fields containing the time of the call, the call number of the vehicle assigned to the job and the latest times of pick-up and delivery as requested by the dispatch program as shown in FIG. 3.

The transaction search 216 is keyed in on any data field. By default, the order entry software looks for the transaction under the current date. A pop-up calendar is then activated by the function key to choose previous dates for transaction tracing.

A number of fields are provided on the screen during the order entry program. The chart below indicates the number of bytes and the fields associated with those bytes for the order entry screen:

| FIELD NAME | NUMBER OF BYTES |
|---|---|
| Civic Number | 4 |
| Street Name | 20 |
| Street Type | 2 |
| Direction Code | 1 |
| Municipality Code | 2 |

In addition, the order entry program can include an automatic pricing program (not shown). The pricing is based upon each user's specification using service codes and distances as determinants. These specifications are then entered using a program which determines (1) the base rate, (2) rate per additional mile, (3) additional charges, and (4) contractual adjustments. Prices are also modified according to special rates applying to specific accounts. These accounts and corresponding rates are contained in a companion file to the account file.

Finally, the order entry program includes a management data display feature control program 242. The display is event driven and watches the transaction file for any events recorded therein. In use, a default screen on the manager's processor appears when that screen is not being used for any other purpose. The events chosen present the manager with a snapshot of the key statistics of the day's operations. A sample screen from the management data display is shown below:

OPERATION'S MONITOR

| General Statistics | Dispatch Statistics |
|---|---|
| Number of Jobs.XX | Undispatched Jobs.XX |
| Tomorrow Jobs.XX | Completed Jobs.XX |
| Prescheduled Jobs.XX | On Time Completions.XX |
| Preloaded Jobs.XX | Time to Pickup.XX |
| Loaded Jobs.XX | Time to Completion.XX |
| Modified Jobs.XX | |
| Deleted Jobs.XX | |

STATISTICS BY ORDER ENTRY STATION

| Station | Calls Processed | Calls Modified | Time of Entry | Typo Entry |
|---|---|---|---|---|
| 01 | XX | XX | XX | XX |
| 02 | XX | XX | XX | XX |

B. The Dispatch Program

A flow chart for the dispatcher program is shown in FIG. 3. The dispatcher program performs a number of functions including routing units, displaying daily transactions, displaying candidate units, assigning units to jobs, accepting confirmations of deliveries from drivers, changing routing assignments, confirming unit performances, zooming in on specific geographic locations, positioning trip locations and determining minimum travel paths.

The dispatch program has several levels of events which are to be serviced. Two of the events are external. Of the other five, four are driven by a real-time clock program 326. The events include keyboard 302, "BITBUS" input 320, vehicle position change 322, stop confirmation buffer increment 324, and the real-time clock events. Real-time clock events include (prescheduled job deadlines 326, emergency transaction deadlines 326 and date change verification 326.) Each of the event levels and subroutines of the dispatcher program 300 is described below.

1. The Keyboard Event

The keyboard program 302 provides the graphic and text screen control functions 304, 306 respectively. In addition, the keyboard program 302 controls activation of a variety of routines which include vehicle candidate selection 308, vehicle assignment 310 and routing and stop confirmations 304.

In operation, the function keys of the keyboard program 302 activate, for example, the loading of appropriate segments of the transaction file which are then transferred to a video buffer. The various function keys and tab keys on the keyboard also cause the transaction file to be re-mapped to a video buffer for display of the appropriate part of each transaction. As such, pick-up information, delivery information and vehicle assignments all can be separately shown once the keyboard functions are pressed. The function keys are totally configurable by the type of application environment and can be defined in a dispatch query menu at the beginning of the program. A detailed description of each function key will be described in more detail below.

2. Graphic Cursor Control and Text Screen Control

The Graphic Cursor Control program operates through keyboard 302 in two modes: a map mode and a scope mode.

The map mode is the default mode. In the map mode, the graphic display 66 (FIG. 1) reveals a map of the entire urban area served. Superimposed upon the map are the following features:

a. When a transaction is highlighted by the cursor on the text screen, 62, 62' the graphic display 66, 66' reveals a red "Up" arrow that marks the precise pick-up location and a red "Down" arrow that marks the precise delivery location.

b. When a "Candidate Vehicle" key is pressed, the display instantly presents up to three vehicles. The vehicles are displayed in order of system preference by color (see discussion below regarding candidate selection 308). The call number of the vehicle then appears in a rectangle at its current estimated position and the down stream itinerary is displayed with all of the stops using different icons for pick-ups and for delivery (square for pick-up, circle for delivery). Icons are also used for any pre-scheduled non-emergency calls.

c. When the vehicle number is assigned, a new itinerary for the vehicle is displayed showing its current location. In addition, the computer displays each pick-up and each delivery assigned to that vehicle and each assignment yet to be completed.

The scope mode is entered from the map mode. The scope mode is activated by a function key toggle (thus, disabling the "Text Screen Control" key). The choice of this mode will cause a window having a central cross-hair to be dispatched. This window or scope is movable to any position on the map. It can be expanded or contracted to establish a zoom window. Prior to entering the scope mode, however, the dispatcher will select a particular area of the map to zoom in. This zoom is accomplished by using arrow keys to position the rectangular scope box. Zoom degree is controlled by the "Page Up" and "Page Down" keys which increase or decrease the size of the scope box.

The scope feature provides a blowup of the area map selected by the scope (in other words, a zoom in on the area within the scope). At larger scales the zoom will reveal the street names which are displayed and aligned with the street direction.

The scope feature, in combination with the zoom program, provides a number of functions, including the following:

a. The scope creates an easily followed vehicle route;
b. The scope can locate a non-fixed hand-off point;
c. The scope can locate an insertion point or points for pick-up and delivery; and
d. The scope can position a vehicle at a post location.

The zoom is activated by a function key and loads an appropriate segment of the memory. The memory then writes information sequentially into a graphics controller buffer.

A refresh function key also is provided which reloads the main map from which the scope is taken. The main map thus forms a separate file which is preprocessed in a bit-map pixel-by-pixel format. The map can be easily retrieved from the extended ("protected") memory area of the microcomputer, using a 386 BIOS interrupt for protected memory.

All of the operation area maps are preprocessed using digital geo-based files (e.g., U.S. Census Bureau GBF/DIME files, statistics files, etc.). The maps are accessed by software in the form of two files created by the preprocessor. The first file sequences the graphic commands compatible with the graphics controller in a META-file format. The latter file comprises a number of pointers into which a zoom can load only those necessary portions of the file for zooming window control.

3. Candidate Selection Routine

The candidate selection program 308 acts to identify the best candidate vehicles to be used for a given transaction. When the user decides to assign the current job to a candidate vehicle, he presses a key which activates a candidate search algorithm 308. The algorithm identifies the best three candidates for a current transaction. The candidates are determined in accordance with penalty points or a "weight" value assigned to each vehicle based upon the following criteria:

a. Distance Out of the Way: The total additional distance travelled if the new stop is to be inserted, or if the new stop is to be reached directly from the vehicle's current location. A user defined scaling factor is applied to the straight line distance. Points are assigned for each mile and minute of additional travel.

b. Estimated Time of Arrival: This estimated time is calculated and the estimated times of all the downstream stops are added together. The points are adjusted for every minute late at the new stop. The estimated times are adjusted based on the actual travel time for each element of the trip, i.e., the time to pickup, time to delivery, time to clear, etc.

c. Vehicle Profile: The vehicle's profile is defined by the weight and volume capacity of the vehicle based upon the following factors:

(1) For emergency applications the current status is used to reject a vehicle if it is in service.

(2) The vehicle category must match the service type codes entered in the order entry program 200.

(3) If the weight or volume is a consideration for the transaction, the vehicle's capacity is checked both at the new stop and at each subsequent stop after calculating an expected weight for all of the stops. The calculation is based upon the vehicle load profile given the anticipated volume and weight for each pick-up. Penalty points are assigned for excess loads at the new stops and at the downstream stops.

The actual search algorithm then is performed in the following steps:

Step 1. Pick a vehicle that has not been assigned.

Step 2. Calculate penalty points for insertion of the pick-up stop.

Step 3. Calculate penalty points from the first unchecked stop downstream and from the vehicle's current position.

Step 4. If the point tally in step 3 is less than the previous point tally, mark the stop.

Step 5. Repeat steps 3 through 5 until all stops have been checked.

Step 6. Repeat steps 2 through 6 for the delivery stop.

Step 7. If the lowest number of points for a marked stop is less than the lowest tally for all previous vehicles checked, mark the vehicle.

Step 8. Repeat steps 1 through 7 for all vehicles in the fleet.

Step 9. Choose the best three candidates according to the lowest point tally for each vehicle.

The criteria can also be weighted to meet the special requirements of the transaction. By assigning zero points to a category, for example, the dispatcher can effectively ignore a constraint. There is also a point reduction factor available for vehicles that are on standby. Since the distance out of the way criteria is high for such vehicles, the user can use this option for reducing the number of efficiency points for such vehicles.

The best candidate vehicles will be displayed in the darkest color. Once selected by the user, the vehicle appears as a user defined icon at its current position on the graphic screen. The itinerary of the vehicle is displayed on text screen in the same color.

4. Vehicle Assignment

Once a vehicle selection call number has been determined by the candidate selection program 308 or entered by the keyboard 302, the vehicle assignment program 310 is used. The assignment routine simply determines the optimal insertion point for a pick-up and for a delivery in the selected vehicle's itinerary. Each of the pick-up and delivery points are then displayed on the graphic screen.

A dispatcher has the option to override an insertion point and can shift through itineraries until he finds his choice. The vehicle is then assigned to a transaction by entering its three digit call number into the "VEH Position" box of the vehicle assignment window. The system usually then requires an average of ten seconds to determine the travel path through the street network of the itinerary, causing a blinking message "Routing" to be displayed.

The system will also warn the dispatcher when an assignment causes any other job to be violated. The system then identifies that job in jeopardy. Thus, if a new stop is inserted into a prescheduled route causing the additional stop to make the estimated time of delivery late, the system will warn the dispatcher that there is not enough time for the previous job. The dispatcher may then override the time window for the previously assigned stop or cancel the new vehicle assignment.

5. Minimum Path Calculation

The assignment program 310 operates in close conjunction with the minimum path subroutine 312. The minimum path program determines the minimum travel time by accessing a road network information base through the expanded memory manager (EMM) software. An expanded memory manager according to the Lotus-Intel-Microsoft standard 4.0 may be utilized.

The minimum path calculation is used to estimate the road and network travel path and to time every new vehicle itinerary that is created by the dispatcher's decision. The minimum path algorithm employs the concept of directional network links ordered by ascending node numbers. The original information for the nodes and links is obtained from a geo-database and is updated by a separate digitizing program. The nodes are organized such that the starting and ending nodes of a link represent the street and network intersections. If the street segment between the links is bidirectional, then two links are used. The network arrays consist of the following information:

| | |
|---|---|
| A = Starting Node | The A Node Number |
| B = Ending Node | The B Node Number |
| | The Link Distance |
| | The Road Category |

The sequencing of links is by increasing "A" and then increasing "B" numbers. Travel times for each link are determined as a function of the link distance and the road category. The travel times are loaded along with the node number arrays into "expanded memory" at run-time. The times for each link are then automatically adjusted during different hours of the day. As such, traffic conditions can be factored into time determinations. The system also has the capability of allowing for graphics input to specify changes in road links based upon unpredicted or unusual traffic conditions, such as accidents, road repairs, police blocks, etc.

The algorithm uses a minimum path tree program starting at a known origin and extending outward to every other node that is in that network. A path to any one of the nodes in the origin is called a branch. There are multiple branches extending from a given node. Finding a minimum path to a destination consists of the following steps:

Step 1. Initialize in an internal array the total travel time of all the branches.

Step 2. Find all the "B" Nodes connected to an "A" Node on the first iteration.

Step 3. For each new "B" node, add the link time from the "A" node to the travel time on that "A" node. The result being the branch time for the current "B" node.

Step 4. Retain the branch travel time in a separate array. If the branch travel time is less than the existing total travel time determined by step 1, replace the existing total time with the new branch time. In another internal array, the "A" node value is stored which was used to reach the branch time in step 3.

Step 5. For all "B" nodes whose travel time is less than the total time retained in Step 4, repeat the iteration of Steps 2 through 4. If at any point in this process the destination node is reached, then reject all of the "B" nodes for which the branch travel time is greater than the branch time to that destination.

Step 6. Repeat Step 5 until the internal array of "B" nodes is empty.

Step 7. Retrace the path from the destination to the origin using the array "A" node value stored in Step 4.

The algorithm operates on an average of about one second per 10,000 links. With expanded memory, the road link network feature can operate in any size metropolitan area. However, to save on memory space, the small inconsequential road map links having negligible impact on travel time may be removed. The removal of these links in the road network while maintaining all of the topological connectivity features of the network is carried by a batch preprocessing technique used in the present system.

The algorithm executes at the same time that the "BITBUS" unit 320 polls the network. In addition, polling of the keyboard permits the dispatcher to view other text windows while the algorithm is executing.

Once the minimum path algorithm is calculated, the vehicle itinerary file is updated and time stamps are placed on the transaction showing estimated time of pickup and estimated time of deliveries. The travel times are then displayed on the screens.

6. The Confirmation Program

The confirmations subroutine 314 interacts with the minimum path program 312 and assignment program 310 to flag acknowledgments of assignments by a vehicle or report various pickup, arrival and departure completions. When receiving confirmations, the estimated time of pickup and estimated time of departure described above are adjusted to effect the downstream vehicle itinerary. All of the assignment confirmation flags are scheduled automatically by the system in the minimum path algorithm and also are sent via the "BITBUS" to the order entry and MDDS program (see FIG. 4).

Confirmations of assignments are represented on the screen by letters beneath a check mark headed column. There are four check marks on the screen, each indicating different confirmation points. The first check mark indicates the vehicle's arrival at the pickup location. When a confirmation is received, the letter "P" is entered under this check mark. The second check mark represents leaving the pickup location and is represented by the letter "L" when confirmed. The third check mark represents a confirmation of arrival at the destination point and is represented by the letter "D" when confirmed. Finally, the fourth check mark confirms the departure from the destination location and is represented by the letter "C" for "Clear".

The appearance of the confirmation screen is shown below:

| Vh | Vh | Spec. Instructions | TOC | TOD | ETP | ETL | ETD | ETC T |
|---|---|---|---|---|---|---|---|---|
| 128 | PLDC | USE BACK DOOR | 13:43 | 13:44 | 13:54 | 14:05 | 14:15 | 14:30 |
| | | | 14:01 | | | | | |
| 312 | P | | 14:03 | 14:05 | 14:13 | | 14:20 | |
| 422 | PL | | 14:03 | 14:04 | 14:20 | 14:35 | 14:45 | |
| | | | 14:04 | | | | | |
| | | DIABETIC | 14:15 | | | | | |
| Tuesday May 3, 1988 | | | 5/6 | | Connect | | 14:31:47 | |

7. The "BITBUS" Confirmation, Vehicle Position and Real-Time Program

The "BITBUS" routine 320 is similar to that described above with reference to FIG. 2. In other words, the software 32 provides error checking, handshaking and polling functions. All "BITBUS" information is provided to either the text control or confirmation screens and has the highest priority of the external event functions in the dispatch program 300.

The get vehicle position change program 322 is activated throughout the vehicle itinerary. This program updates the vehicle's position in the network and on the screen.

Figure 4:
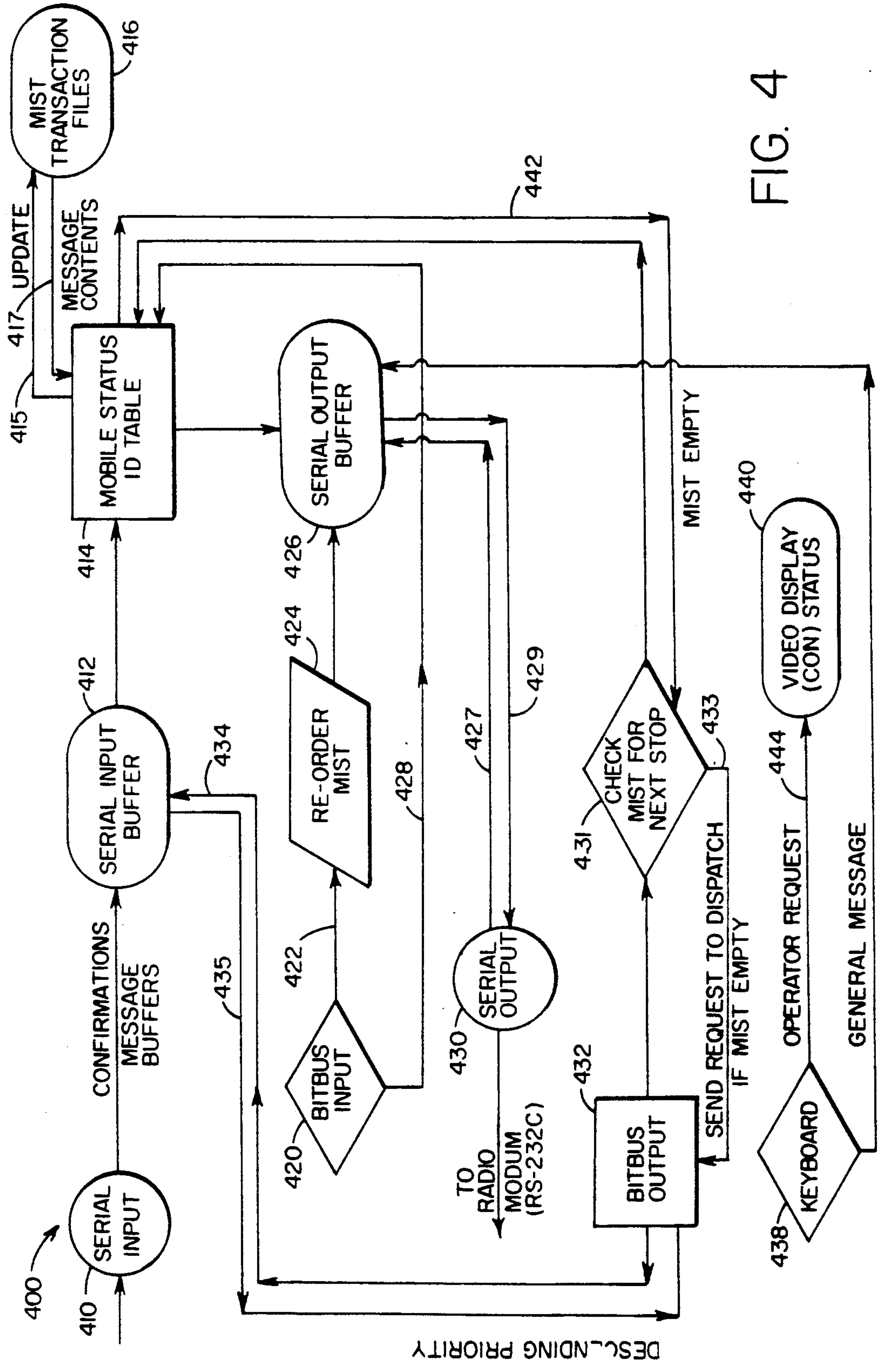
FIG. 4 is a flow chart of the mobile digital display program employed in the hardware of FIG. 1A.

The stop confirmation buffer 324 is filled by the "BITBUS" messages either from the dispatch system program 220 or the MDDS Software (FIG. 4). The confirmation routine 314 routinely checks the stop confirmation buffer 324 and then incrementally processes the next outstanding confirmation. Data from the confirmation buffer is regularly polled by the confirmation routine 314.

The real-time clock procedure operations are as follows: Pre-scheduled jobs are entered into a permanent file with specific days of the week. The system then automatically loads the appropriate jobs each day into a daily transaction queue. As a result, the pre-scheduled jobs can be added, deleted or modified up to a year in advance. The pre-scheduled transactions are created at the order entry stage (FIG. 2) and include time windows which will not be displayed on an undispatched job screen until a specific delay before a deadline (usually a half hour). Thus, the real time clock subroutine 326 is polled at this level in order to determine whether any of the pre-schedules should become active on the text display. Once a half hour increment is reached, for example, the real time clock 326 causes a pre-scheduled reminder to be activated which is then provided to the text control routine 304.

All transactions that are entered by the order entry program in FIG. 2 as emergencies are automatically assigned deadlines. Emergency indicators are raised within a specified time period from the time that the call is stamped by the order entry program. Failing a pickup confirmation, for example, within such a specified deadline (as determined from polling to the real-time clock 326) will change the video attribute to a blinking message.

The real time clock affects the date change verification which occurs at the lowest level of the event processing. In use, the dispatch program 300 polls the real time clock 326 in order to detect a midnight transition to the next calendar day. Once the transition is detected, the operator is warned to activate a function key in order to close the current day's files. The next day's files are then automatically opened and a warning is echoed on the "BITBUS" to all the other workstations to automatically close the previous day's files and open the next day's files.

8. Operation of the Dispatch Program

When the unit is turned "ON" a daily transaction screen is displayed. The screen includes the names of the patients, facilities and their addresses. If none of these transactions have yet been dispatched, the operator can then proceed to assign a unit to that transaction. That is accomplished by pressing a function key bringing the user into the candidate selection program 308 described previously.

A user can then select a candidate vehicle by pressing a function key and positioning the cursor on the field where the unit number can then be entered. Once a unit has been assigned, an estimated time of arrival will be displayed. The routing occurs automatically and the screen will flash for a given number of seconds allowing the system to perform the dispatching function.

In the event that it becomes necessary to assign additional trips to a given unit, the user then places the cursor over the unit "field" of the transaction screen and enters that unit number. A red circle will then appear in the graphic screen around the unit. The system queries the user to confirm the next stop that they just entered. The user can then change the insertion point for the new stop by pressing the "+" key which will move the red circle to the next stop downstream on the graphic screen.

Once a driver calls in to confirm that an assignment has been cleared, the confirmations program 314 can be accessed. The user can then enter the confirmation symbols as described previously. A dispatched unit also can be unassigned by pressing a function key. The function will then automatically remove the pickup and destination requirements from the computer itinerary.

The dispatch program includes a number of monitoring features which better facilitate the use of the system to best fit the cognitive processes that a dispatcher must use to effectively coordinate vehicle pick-ups and deliveries. One of those features is the dispatch query menu which allows an operator to view selected information from the daily transactions file. That menu is configurable for different applications. The ambulance dispatch query menu appears as follows:

| Dispatch Query Menu | |
|---|---|
| (1) | Incomplete Trips |
| (2) | By unit no. |
| (3) | Undispatched trips |
| (4) | By patient name |
| (5) | Cancelled trips |
| (6) | All trips |
| (7) | All trips by unit |

The various menu options in the dispatch query menu are accessed by pressing the number adjacent each query category and then hitting the "Return" key.

The options operate as follows: Option No. 1 displays all of the trips which have not yet been cleared by the system by vehicle unit number; Option No. 2 will first prompt the user to enter a unit number and then display all of the information regarding the incomplete trips for this unit. The third option, "Undispatched Trips," displays all trips for which a unit has not yet been assigned; the fourth option will first prompt the user to enter the patient's name and then display all of the trips, dispatched and undispatched, for that patient.

The cancelled trips option number 5 displays all trips which have been cancelled from an order entry workstation. Option 6 allows the user to view all of the trips, whether dispatched or undispatched, confirmed or unconfirmed. However, deleted trips will not be displayed. Finally, option number 7 will first prompt the user to enter the vehicle unit number and then display all of the trips for that particular unit. The trips are displayed whether they have been dispatched or undispatched, confirmed or unconfirmed.

Another set of functions relate to control of the text screen control program 302 and graphic cursor control program 306. These keys can be classified into different categories.

The arrow keys, for example, are used to move the cursor around the text and graphic screens without changing the content of data. The "Page Up" and "Page Down" keys are used to display different pages on the text screen and to increase or decrease the size of the scope on the graphic screen. The "Tab" Key is used to move through different fields for each trip.

The function keys (F1 through F10) perform specific functions which affect the content of data. A set of extra function keys is created by alternative use of the "ALT" or "SHIFT" keys in combination with the function keys.

The system is always in one of two modes, text mode or graphics mode. This is due to the fact that certain keys are used for two purposes. The effect of pressing those keys will thereby depend upon the current mode. To switch modes, a function key is pressed. If the system is in a graphics mode, the letter "S" will appear on the bottom line of the screen. This letter stands for "SCOPE".

In the graphics mode, a box with a cross-hair in the middle is first raised on the graphics screen. This box represents, as previously described, the "Scope" which can be moved around within the limits of the screen using the abovediscussed arrow keys. The "Scope" can be made larger or smaller by using the "PAGE UP" or "PAGE DOWN" keys respectively.

As mentioned, the scope is used for zooming. The zooming feature is activated by a function key which acts to enlarge and display whatever appears within the scope window. A previous window can be recalled using the "ALT" key along with the function key which then displays the previous map display. In addition, the letter keys "U", "D", "L" and "R" allow the user to respectively move the entire map up, down, left and right. The screen can thereby move half way in any direction, but still maintain the same scale if the user wishes to see something at the edge of the screen.

The scope can also be used in combination with function keys to perform various graphic input functions such as relocation of a pick-up or delivery point or of a vehicle.

In the text mode, the user can move freely among the trips to be dispatched. As previously described, each trip is represented by a line on a transaction screen. The arrow keys are used to move the cursor along each row and column on the screen.

The operation of the function keys is as follows:

| Function Number | Function Identifier | Description |
|---|---|---|
| Function 1 | Help | List of Commands to be displayed on the Text Screen. Pressing any key will return the User to where they left off. |
| Function 2 | Toggle | The F2 switches the system from a text to a scope mode and back again. |
| Function 3 | View Pickup Info. | Moves the cursor on the Text Screen to display Pickup Information for that trip. That information includes special instructions and latest time of arrival. The destination is also displayed. |
| Function 4 | View Destination Information | This function moves the cursor to the portion of the activity screen which displays destination information. Special instructions for the destination of the current trip are displayed across the top. Latest time of arrival is also displayed. |
| Function 5 | View Extra Information | Moves the cursor to the portion of the activity screen which displays the unit field and pickup destination confirmations. Also time windows and price of the current trip are displayed. |
| Function 6 | Dispatch Query Menu | Displays dispatch query menu. |
| Function 7 | Display Candidate Unit | The F7 system command causes the System to search for candidate units. As previously discussed, the candidates are listed by color indicating the relative merit of each choice. No automatic dispatch occurs. The final decision remains up to the user. |
| Function 8 | View Original Window | This F8 function causes the original window to be displayed on the graphic screen. |
| Function 9 | Zoom | Causes the contents of the scope to be enlarged and drawn on the graphic screen. |
| ALT Function 2 | Recorder Itinerary | This function allows the user to change the order in which stops will be accomplished. When pressed, the system then prompts the user for the unit number. Once done, the user will be prompted to position the arrow of the scope over the point to be reordered. When this is entered, the stop will be deleted and the system will guess the new place that it is to be inserted. Once the stop is being reinserted, the system will prompt the user for another point to be reordered. |
| ALT Function 3 | Input Pickup Point | By pressing the F3 key, the current pickup point will be repositioned at the center of the scope. This information is |

-continued

| Function Number | Function Identifier | Description |
|---|---|---|
| | | automatically updated in the file. |
| ALT Function 4 | Input Destination | Repositions the destination in the same manner as described above with respect to ALT function 3. |
| ALT Function 5 | Input Unit Position | By pressing the ALT F5 keys, a unit is repositioned at the center of the Scope. This function operates by first responding to the system query of the unit number. The desired unit number should be then entered. If the unit already has an itinerary, it will ask whether the driver is already there, and whether the driver is on his way. |
| ALT Function 6 | Reconnect Network | When pressing the ALT and F6 function Station keys, the user is queried whether they wish to destroy the old connection. If they type "YES" they must press any key and the station will be disconnected. When all displays are disconnected in the system, the screen will show a system disconnect message at the bottom. To get the network up and running again, the ALT and F6 keys are pressed again. The user will then be asked whether they wish to destroy the old connection. Upon answering "YES", they will then receive a message "WAIT FOR OTHERS. THEN PRESS ANY KEY". By pressing any key the system will be reconnected and an update of all the things that have been done while that unit was disconnected will be displayed. |
| ALT Function 7 | Select Unit for Display | Allows the dispatcher to view some or all of the units on the graphics screen. The user must enter the unit number which then causes all of the units to be displayed on the graphics screen. By pressing a "ZERO" all of the units will then be erased. |
| ALT Function 9 | View Previous Window | Causes the previous window to be displayed on the graphics screen. |
| ALT Function 10 | Exit | Causes the program to exit to the DOS PROMPT. This is done without losing any information. All automatic updating will still occur. |
| Shift Function 1 | After Midnight | Automatically changes the date on the system. Automatically loads all of the pre-scheduled, tomorrow and reservation information resident in the system memory to the new day. Once activated, |

-continued

| Function Number | Function Identifier | Description |
|---|---|---|
| | | all the files for that day as well as the current trips which are incomplete are sent to all the work-stations in the system. At midnight the date on the bottom of the lefthand corner of all of the screens will begin to flash. This is a reminder to press the SHIFT F1 KEY. The date will stop flashing once that is completed. |
| SHIFT Function 2 | SSM | Displays the system status management screen. |
| SHIFT Function 3 | Standby Units | Allows the vehicle user to view all of the units with nothing to do. These units will be represented on the graphics screen. |
| SHIFT Function 5 | Debug Key | Sends a copy of the contents of each transaction screen to a debug file. These are stored in a memory for later reference by a service representative. |
| SHIFT Function 6 | Send Transaction File | Used in the case of a system failure in order to save the system functions. |
| SHIFT Function 9 | Image Making | Causes the system to generate a special file which will allow the contents of a graphics screen to be automatically recorded on film. This function is a special function not normally used during dispatching operations. |

9. The Dispatch Queue

The afore-described subroutines and functions operate on a dispatch queue which is a file of all transactions for a single shift. At system wake-up after each shift is changed at midnight, the dispatch queue is loaded automatically into every workstation including order entry work-stations. The kind of transactions that are loaded, include pre-scheduled jobs for the current day of work, jobs entered for the next day, and incomplete or over-shift jobs from the previous shift. As previously mentioned, the dispatcher is notified in advance of any pre-scheduled jobs with specified pickup times.

The dispatch queue file is a list of all jobs in job number sequence with its primary sort being accomplished by call priority. Once the vehicle is assigned to a given transaction, the job disappears from the list of undispatched transactions.

Transactions are entered into the queue at the order entry program level. All information posted in the queue is instantaneously transmitted to a date dispatch queue file. The newly entered information is signalled to the user by a bell on the screen. Transactions that are modified or deleted at the order entry level are signalled by a low buzz tone on the screen. The maximum allowable number of transactions for the queue is 10,000 per day. A single dispatch station may handle no more than 3,400.

10. System Status Management Program (SSM)

The SSM is entered in the order entry routine as described above. The SSM maintains vehicle in strategic locations when they are not performing. Once the selections have been entered at the order entry stage 200, the plans are entered into the dispatch work-stations and are created to coincide with peak times of days, or other considerations. To verify compliance, the SHIFT and F2 keys are pressed, such that the current plan for that day and time are displayed. The display screen for the SSM is shown below.

| Posts | Vehicles |
|---|---|
| Post 1: 412 Palm Canyon | Veh 1 : ALS 128 13:45 |
| | Veh 2 : BLS 612 13:52* |
| | Veh 3 : NEV 341 13:32 |
| Post 2: Central Station | Veh 1 : ALS 412 |
| | Veh 2 : BLS 231 13:44* |
| | Veh 3 : NEV 111 |
| Post 3: Sunset & Vine | Veh 1 : ALS 439 13:30 |
| | Veh 2 : BLS 124 |
| | Veh 3 : NEV 222 13:38 |

Press ESC to return or >Return< to escape.

As shown, vehicles are positioned at a given post. Each vehicle is assigned a vehicle type (e.g., ALS, BLS). If the vehicle is not at that post, but is on its way there, the estimated time of arrival will be displayed next to the vehicle unit number. If there is no unit at that post and none on its way, the screen at that line will flash. meaning that correction is required. Between the estimated time of arrival and the vehicle type, the unit number is identified. If a vehicle has been downgraded (in other words, a high priority vehicle as a standby has been downgraded to a low priority vehicle), there will be an asterisk at the end of each line.

To insure compliance with the SSM, the graphic screen will display all the vehicle units which are not on post according to the current plan. The graphic screen will also display current post locations as round red rings, with the post number appearing inside them. A vehicle unit is positioned at the post as follows:

1. Position the cursor on the flashing vehicle number on the text screen and press the F7 key. The screen will then display the three candidate units for that post on the graphic screen.

2. Look at the available units on the graphic screen and assign the vehicle unit whose current location is closest to the post. To do so, the user selects a vehicle by pressing "ALT F5," which will then require the user to enter a vehicle unit number. The user must then enter the post number that the vehicle is to be moved to. The system will then request whether the vehicle unit is enroute to the post. If the answer is "YES", the post location will be added to the unit's itinerary and will display the unit number and estimated time of arrival on the SSM screen. If the unit is already at the post location, the unit number will be displayed on the SSM screen. In either case, the line on the text will cease flashing because the operator is in compliance with the SSM Plan.

C. The Mobile Digital Dispatch Program

Referring now to FIG. 4, the mobile digital dispatch program (MDDS) functions to prompt information involving dispatch decisions from the dispatch program. The MDDS then effects changes at the downstream locations of the affected vehicle's itinerary and drives those changes through to the mobile terminals. Thus, the MDDS prompts information at one end and sends the revised order of jobs at the other end. The jobs are automatically reshuffled based upon the changed priorities. The drivers may also be allowed to reshuffle the job order at the mobile terminals based upon certain dispatch or user defined constraints.

The MDDS includes a serial input (SIN) routine 410. That routine requests another stop in the mobile terminals, internal tables. In addition, a "BITBUS" input 420 and a keyboard input 438 are also utilized. The output events for the MDDS program include the serial output routine 430, the "BITBUS" output routine 432 and the video display console status routine 440. In descending order of priority, events are serviced from the SIN 412, the "BITBUS" 420, the Serial Output (SIO) 430, the "BITBUS" output 432, and the keyboard 438.

More particularly, the serial input 410 provides data directly to the serial input buffer 412. Information in the buffer 412 represents incoming messages received from the mobile terminals (See FIG. IB) and from the dispatch workstations. That information includes the completion of a stop, the confirmation of various tasks and driver queries. This information will in turn cause the MDDS program 400 to eventually request the "BITBUS" output 432 to make another stop in the itinerary that is stored in the dispatch program 300. As such, the serial input buffer 412 will send a confirmation buffer signal to the output bus along line 435. All of the information in the serial input buffer 412 is stored as an internal table 414, indicating the mobile identification status of each vehicle (MIST). Information in the MIST table is, in turn, sent via line 415 to the MIST transaction files 416.

The "BITBUS" input routine 420 provides four basic functions. First, if the input is a transaction file modification, then the input is provided to the MIST along line 428. No external output events are generated from such a change.

The second function occurs when an assignment interruption input arrives from the dispatch program 300. The interruption indicates that a vehicle's current itinerary has been revised by a stop insertion and that the vehicle's immediate destination has to be rerouted. Such an interruption will cause a signal along line 422 to the reorder MIST routine 424. The routine 424 will automatically reorder the MIST file by providing reorder commands through a serial output buffer 426 which will then act to reorder the MIST table 414. Accordingly, the calculation of downstream pickups will be readily available.

The third input is an assignment notification which indicates that the vehicle has been assigned a new stop. The assignment notification information is also sent along line 428 to the MIST 414.

Finally, the fourth "BITBUS" input involves pre-fetching the vehicle's next stop. That function involves the "BITBUS" responding to a pre-fetch input by placing a fetch request along line 428 for later preprocessing by the MIST 414, the serial output buffer 426 and the serial output 430. Other "BITBUS" messages include notification of cancellations, requests for vehicle status and notification of vehicle breakdowns.

The serial output routine 430 checks for and clears any outstanding messages in the serial output buffer 426. The communications are performed along lines 427 and 429, respectively. In addition, that information is checked in relation to the MIST table 414 for any new entries. Those new entries are filed in the serial output buffer 426 and then returned to the serial output routine 430.

The "BITBUS" output 432 checks the serial input buffer 412 along lines 434 and 435 for any messages coming in from the mobile terminals. When messages are received, the "BITBUS" output 432 sends such information out directly to the dispatch program showing the vehicle's next stop in relation to the last MIST entry. The mobile terminal also checks the MIST for its next stop through routine 431. If the MIST is found to be empty at line 442, it will then send the request to the dispatch program 300.

Pre-fetch stops output by the serial output 430 to the mobile terminal are kept hidden from the vehicle driver until all upstream stops on the itinerary are completed. The keyboard function 435 under the MDDS is reduced merely to a passive task. An MDDS operator may send global text messages along line 444 to all vehicles or perform housekeeping tasks and request status screens, etc. Those events directly effect the video display console 440 and also generate messages to the serial output unit 430 or the "BITBUS" output 432. The mobile terminal as shown in FIG. 1B communicates to the system only through the MDDS Software.

Although not illustrated, the mobile terminals as shown in FIG. 1B include a mobile terminal queue which is similar to the MDDS queue, but contains fewer fields. The mobile terminal queue can be user configurable to allow drivers to reshuffle their vehicle itineraries.

D. Finance and Accounting Program

Figure 5:
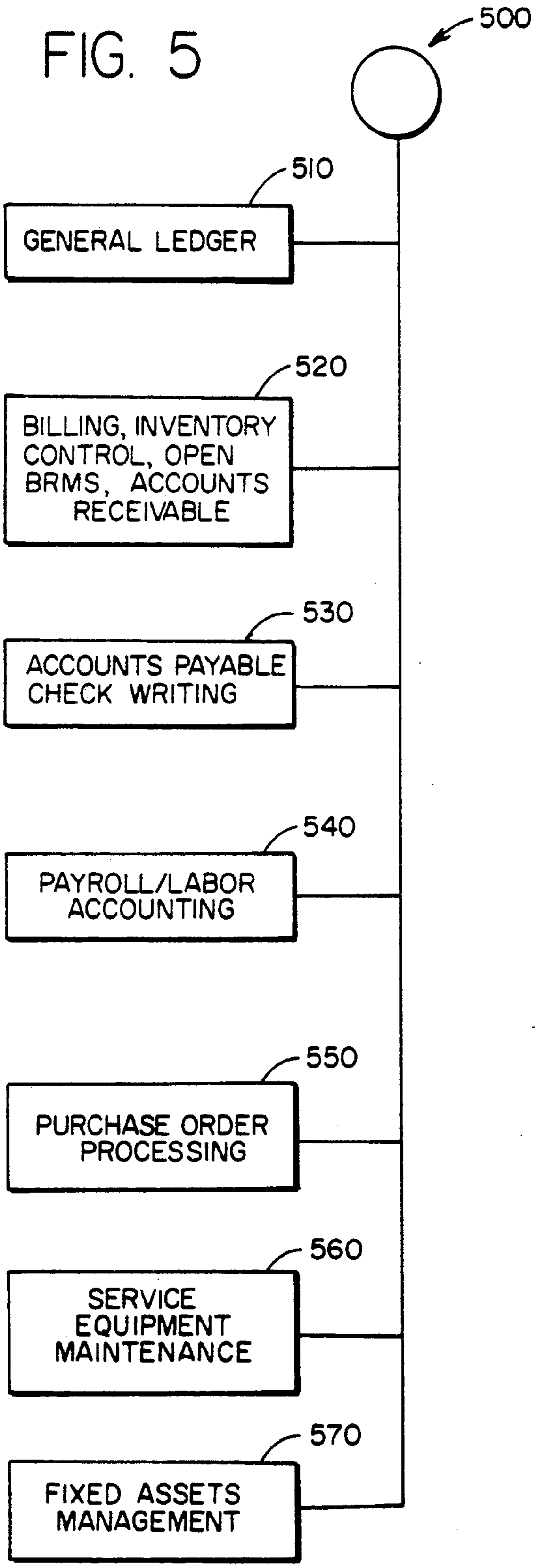
FIG. 5 is a flow chart of the accounting program employed in the hardware of FIG. 1A.

As shown in FIG. 5, the system includes the capability of utilizing a finance and accounting program 500. The program has the same open architecture and PC-compatible design philosophy of the order entry, dispatch and MDDS programs. Moreover, the program 500 includes a dBASE management system in order to share the same memory handling functions as the other programs. All que files are sent through a call clearing function that edits all data captured in the dispatch (CAD) environment and allows for keyboard entry of additional information taken from actual "paper records" of field occurrences. At the call clearing step, all billing modes and procedures or diagnostic codes are added to the record. Also at that time, the Transaction file is downloaded to all the other modules in the "business system." All such modules share a common dBase data base. Information fields that feed each module, for example, inventory usage, payroll information, vehicle usage, etc. are updated in each module.

The accounting program 500 allows for all accounting and inventory control functions to be readily managed. The functions also enable information to be easily added, customer reports to be readily created and invoices and mailing labels to be quickly generated. If an inventory item is used during a run, it would not only show up on the invoice but it would also be deleted from the inventory. A reorder would also be automatically triggered and be subject to review by a quality control program to determine compliance with various protocols. Moreover, the software is menu driven and readily accessible and understandable by any user.

The accounting library includes a general ledger 510, a billing inventory control and an open item accounts receivable routine 500. Other functions include an accounts payable and check writing program 530, a payroll and labor accounting program 550, a purchase order processing program 540, a service equipment and maintenance program 560 and a fixed assets management routine 570. Accounting programs, such as those included in the Database Accounting Library available from SBT Corporation of Sausalito, Calif. may be used with the present invention.

With respect to the general ledger program 510, all financial reporting capabilities are maintained on a period-to-date and a year-to-date balance for a number of years. Features included in this routine are consolidated in comparative income statements, balance sheets and automatic multiple-distribution entries.

The billing, inventory, and open item accounts receivable routine 520 performs all of the billing inventory control and accounts receivable functions for the system. In addition, customer and inventory labels can be printed and the system will also provide high speed lookup of customer and inventory codes. Cash receipt registers, items receivable, aging and user definable reports are included in this package. The system can also track back orders and analyze sales and gross margins (on a per item basis).

The accounts payable and check writing function 530 provides a complete accounts payable system including aged cash requirements, check register generation and distribution of payments to the general ledger accounts.

The payroll and labor accounting routines 540 maintain all payroll and labor distribution information. These include, but are not limited to, payroll tax calculations, and deductions made for employees during regular payroll periods. Calculations of gross earnings will include hourly, salary, commission and piece work information. Separate tax computation tables may be included for each state covered by the system.

The purchase order processing program 550 provides a complete purchasing and inventory control system. The system includes a vendor and inventory label printing routine as well as report generation for inventory reordering, back orders, purchase order status by item, and vendor and buyer related data.

The service and equipment maintenance routine 560 tracks maintenance and service contracts and lease payments in user-definable equipment categories. This module also schedules upcoming maintenance, records service, contract activities and also tracks purchasing and leasing from different vendors.

The fixed asset management routine 570 provides a record for each asset and calculates depreciation using a variety of different depreciation methods. In addition, the routine generates loan amortization schedules and combines principal and interest rate payments for specified equipment.

E. Insurance Claims Routine

The insurance claim module 600 edits and processes Health Care Financing Administration (HCFA) H1500 Claims to third party payers including Medicare, Medicaid and commercial insurers. The insurance module 600 is designed to incorporate the specific edits required by any client's third party carriers and fiscal intermediaries. This ensures that only clean claims are forwarded. As the insurance module is integrated with the dispatching system software, the required data is entered automatically by a custom download program.

The system 600 works in such a manner that claims meeting insurance carriers' "edits" do not need additional operator input. However, claims that do not pass background edits are brought up individually. The claims data are formatted into a HCFA 1500 screen that emulates the HCFA form. Based upon the library of edits, invalid data fields are readily highlighted and data entry skips to the error portions of the screen only. Where information is not immediately available, the claim can be set aside and called up and corrected at any time in the future.

The first eligible edited claims are batch transmitted to an electronic claims processing service on a daily basis. Then detailed reports are generated to the client's side of all the claims transmitted. After claim submission, the reports detailing the claims received and accepted are returned to the client. The incorrect claims are reported out and errors are provided in order to correct such claims for resubmission.

The insurance module 600 incorporates a variety of management reports to track the numbers and values of claims received and paid. Moreover, the insurance module is designed to interface with the electronics claims processing services that handle claims for the major insurance carriers, such as that offered by PCX, Inc. of Elwood, Ind.

Figure 6:
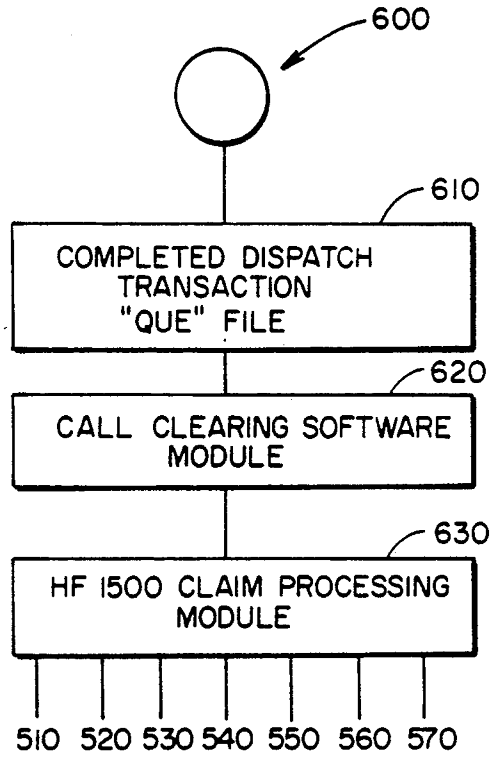
FIG. 6 is a flow chart of the insurance claim program employed in the hardware of FIG. 1A.

As shown in FIG. 6, the insurance module 600 incorporates several modules, the last of which feeds the processed and edited information to the business system module 500. The insurance module 600 receives its information from the CAD system, as previously described. The information is first fed to a completed dispatch "Que" file 610. All Que files are then sent to a call clearing software module 620 which edits all data captured in the display (CAD) environment and allows for keyboard entry of additional information taken from actual "paper records" of field occurrences, also as previously described.

The output from the call clearing software module 620 is fed to the HF 1500 claim processing module 630, as previously described. Upon completion of the claim processing, the transaction file is downloaded to all of the other modules 510, 520, 530, 540, 550, 560 and 570, which form the "business system" or finance and accounting program 500 of the present system.

Although only a preferred embodiment is specifically illustrated and described herein, it will be appreciated that many modifications and variations of the present invention are possible in light of the above teachings, and within the purview of the appended claims without departing from the spirit and intended scope of the invention.

What is claimed is:

1. An integrated vehicle dispatch system, comprising:

a management device for automatically managing selection and assignment of said vehicles;

a coordination device for coordinating scheduling of vehicle pickups and deliveries based upon said selections by said management device, said coordination device comprising a confirmation device that provides acknowledgements of assignments on a per vehicle basis; and a communication device for providing information to said integrated vehicle dispatch system such that said vehicles are efficiently utilized.

2. The vehicle integrated dispatch system according to claim 1, wherein said management device includes a searching device which enables information to be automatically searched and provided to said integrated vehicle dispatch system.

3. The integrated vehicle dispatch system according to claim 2, wherein said searching device includes a transaction searching capability, an address searching capability and an account searching capability whereby address, transaction and account information is automatically provided to said management device.

4. The integrated vehicle dispatch system according to claim 3, wherein said address searching device is adapted to receive 911 emergency information input and automatically fill in missing address data from said 911 emergency information input.

5. The integrated vehicle dispatch system according to claim 3, wherein said address searching capability performs a search on a metropolitan area and then on a civic address until a match is found.

6. The integrated vehicle dispatch system according to claim 5, whereby when a match is not found by said address searching capability a close name found during a subsearch is provided.

7. The integrated vehicle dispatch system according to claim 6, whereby said address searching information is coordinated with a geo-based file in order that addresses are automatically mapped onto a video display of a given delivery area.

8. The integrated vehicle dispatch system according to claim 3, whereby said transactions searching capability searches a first occurrence of a transaction for customers sequentially until a desired transaction is found.

9. The integrated vehicle dispatch system according to claim 8, whereby if a transaction is not found under a current date, a pop-up calendar is displayed in order to choose previous dates for transaction tracing.

10. The integrated vehicle dispatch system according to claim 2, wherein said management device further comprises a rolodex routine whereby a user is automatically provided with all information most closely related to that search performed by said user.

11. The integrated vehicle dispatch system according to claim 2, wherein said management device further comprises a posting function which enables the user to flush out and post all transactions based upon real-time clock periods.

12. The integrated vehicle dispatch system according to claim 11, wherein said posting function enables a user to post transactions for today, post transactions for tomorrow, post transactions concerning reservation dates previously established by a transaction search, and post transactions in multiple forms.

13. The integrated vehicle dispatch system according to claim 1, wherein said management device further comprises a system status management module allowing for identification of resource posts which are defined by civic address.

14. The integrated vehicle dispatch system according to claim 13, whereby said system status management module allows for a user to create management plans for specified days of a week at specified hours such that said vehicles can be assigned to said posts based upon said specified days and hours.

15. The integrated vehicle dispatch system according to claim 14, whereby said posts are defined by a number of vehicles required for each post and a type of vehicles required for each post.

16. The integrated vehicle dispatch system according to claim 15, wherein said vehicle type is defined by vehicle equipment characteristics and by on-board personnel qualifications.

17. The integrated vehicle dispatch system according to claim 16, wherein said system status management module is raised on a user's screen within a preset time period prior to said specified day and hour such that said operator can assign resources to posts in accordance with said management plan.

18. The integrated vehicle dispatch system according to claim 1, wherein said management device further comprises a pricing program whereby automated prices are appended to transaction records.

19. The integrated vehicle dispatch system according to claim 18, wherein said automatic pricing program bases prices upon a base rate, a rate per additional mile, additional charges, contractual adjustments and special rates applying to specific accounts.

20. The integrated vehicle dispatch system according to claim 1, wherein said management device further includes a management monitor display which provides a snap shot of key operational statistics of a given time period of operation of said integrated vehicle dispatch system.

21. The integrated vehicle dispatch system according to claim 1, wherein said coordination device includes a graphic display revealing an entire map of the delivery and pickup locations for said vehicles.

22. The integrated vehicle dispatch system according to claim 21, wherein said graphic map display employs icons indicating said pickup location and said delivery location.

23. The integrated vehicle dispatch system according to claim 22, whereby said graphic map display highlights a proposed minimum vehicle route from said pickup location to said delivery location.

24. The integrated vehicle dispatch system according tc claim 23, whereby said minimum vehicle route is calculated based upon a directional network link ordered by ascending node numbers.

25. The integrated vehicle dispatch system according to claim 24, whereby said nodes are organized such that a starting and ending node of one of said links represents street and network intersections.

26. The integrated vehicle dispatch system according to claim 25, whereby travel times for each link are determined as a function of said link distance and a road category.

27. The integrated vehicle dispatch system according to claim 26, wherein times for each link are automatically adjusted during different hours of a day such that traffic conditions, accidents, road repairs and other circumstances can be factored into time determinations.

28. The integrated vehicle dispatch system according to claim 27, wherein the said minimum path is calculated by iterating all nodes connected to a starting point, calculating a total time for each branch of said node and determining a total time of travel between a beginning node and an ending node for each vehicle, such that a minimum travel time per vehicle is determined.

29. The integrated vehicle dispatch system according to claim 1, wherein said coordination device further comprises a candidate selection program for identifying best candidate vehicles to be used in a given transaction.

30. The integrated vehicle dispatch system according to claim 29, wherein said candidate selection program identifies three best candidates for a current transaction, said determination being determined upon weighted criteria pre-selected by a user.

31. The integrated vehicle dispatch system according to claim 30, wherein said weighted criteria include a time to pickup, a time to delivery, a distance the vehicle must travel to said pickup and delivery points, and capabilities of each of said vehicles considered.

32. The integrated vehicle dispatch system according to claim 1, wherein said coordination device further comprises a vehicle assignment means, wherein optimal insertion points for a pickup and for a delivery are displayed on a graphic display.

33. The integrated vehicle dispatch system according to claim 1, wherein said acknowledgements include arrival at a pickup location, leaving a pickup location, arrival at a destination location, and clearing delivery at said destination location.

34. The integrated vehicle dispatch system according to claim 1, wherein said graphic display includes a scope mode which allows a user to expand or contract said map over a particular area of said map.

35. The integrated vehicle dispatch system according to claim 1, wherein said coordination device includes a transition queue that pre-schedules jobs up to a year in advance.

36. The integrated vehicle dispatch system according to claim 35, wherein said daily transaction queue acts in conjunction with a real-time clock to cause a reminder signal to be activated a set time period in advance of a real time event.

37. The integrated vehicle dispatch system according to claim 36, whereby said daily transaction queue provides emergency deadline signals when a pre-schedules time period has expired.

38. The integrated vehicle dispatch system according to claim 37, wherein said real-time clock affects date change verification and said integrated vehicle dispatch system, such that a midnight transition is detected activating all current day's files to be transferred automatically to a next day date.

39. An integrated vehicle dispatch system, comprising:

a searching device for finding information relating to a dispatch order received by said vehicle dispatch system;

an accounting device for selecting automated account reflected information for a received transaction;

a candidate selection device for selecting an appropriate vehicle for said received transactions;

an assignment device for automatically assigning said candidate vehicle to said received transaction;

a monitoring device for following progress of said vehicle through said assigned transaction;

an updating device for automatically updating information relating to said assigned transactions based upon actual vehicle location; and a reporting device for reporting vehicle progress on a graphic map display.

40. An integrated dispatch computer system, comprising:

an order entry workstation comprising a plurality of microcomputers connected via a "BITBUS" network to one another and via modem to an input line;

a dispatcher workstation comprising a plurality of microcomputers having text and graphics screens associated with each computer, wherein each of said microcomputers is connected via a "BITBUS" network to each other and to said order entry workstation;

a mobile digital data microcomputer connected to said dispatch workstation by said "BITBUS" and to a radio transceiver in order that information received by said dispatch workstation is sent by said transceiver to a plurality of vehicles; and a mobile vehicle microcomputer connected to a transceiver such that information received by said mobile digital data device is displayed to a driver of a mobile vehicle.

41. The apparatus according to claim 40, whereby said integrated dispatch computer system is fully redundant such that inputs in one microcomputer are stored in memories of all of said microcomputers.

42. The apparatus according to claim 41, wherein said integrated dispatch computer system is tied into a vehicle locator information network based upon a LORAN format such that said system displays information in the form of detailed maps.

* * * * *